United States Patent [19]

Wright

[11] Patent Number: 4,688,172

[45] Date of Patent: Aug. 18, 1987

[54] INITIALIZATION APPARATUS FOR A DATA PROCESSING SYSTEM WITH A PLURALITY OF INPUT/OUTPUT AND STORAGE CONTROLLER CONNECTED TO A COMMON BUS

[75] Inventor: Charles G. Wright, Round Rock, Tex.

[73] Assignee: International Business Machines Corporation, Armonk, N.Y.

[21] Appl. No.: 670,504

[22] Filed: Nov. 13, 1984

[51] Int. Cl.[4] .......................................... G06F 13/36
[52] U.S. Cl. .................................................... 364/200
[58] Field of Search ... 364/900 MS File, 200 MS File

[56] References Cited

U.S. PATENT DOCUMENTS

| | | | |
|---|---|---|---|
| 3,949,379 | 4/1976 | Ball | 364/200 |
| 4,028,663 | 6/1977 | Royer et al. | 364/900 |
| 4,030,073 | 6/1977 | Armstrong, Jr. | 364/200 |
| 4,051,326 | 9/1977 | Badagnani et al. | 364/900 |
| 4,060,849 | 11/1977 | Bienvenu et al. | 364/200 |
| 4,078,259 | 3/1978 | Soulsby et al. | 364/900 |
| 4,087,855 | 5/1978 | Bennett et al. | 364/200 |
| 4,131,941 | 12/1978 | Siegal et al. | 364/200 |
| 4,149,242 | 4/1979 | Pirz | 364/200 |
| 4,263,650 | 4/1981 | Bennett et al. | 364/200 |
| 4,335,426 | 6/1982 | Maxwell et al. | 364/200 |
| 4,562,535 | 12/1985 | Vincent et al. | 364/200 |
| 4,590,468 | 5/1986 | Stieglitz | 364/200 |
| 4,621,342 | 11/1986 | Capizzi et al. | 364/900 |

Primary Examiner—Gareth D. Shaw
Assistant Examiner—Kevin A. Kriess

Attorney, Agent, or Firm—J. B. Kraft; Thomas E. Tyson

[57] ABSTRACT

A plurality of controllers are connected to a common bus in turn connected to a central processor. Each of the controllers respectively serves as an interface between the central processor and at least one storage unit for input/output device. In order for the controllers to distinguish between addresses, the addresses sent from the central processor contain identifier segments indicative of the controller to which the address is being sent. Controllers in turn contain programmable comparison means for comparing the identifier segments in addresses to a stored controller identifier indicative of the controller. Because the comparison means are programmable, controller identifiers have to be set up each time the system is turned on. Consequently, the present invention provides such turn on or initialization means including a read-only initialization program stored in one of the storage units: the controller interfacing with this storage unit becomes a master controller; the master controller has apparatus which is selectively activated only during initialization for accepting all addresses irrespective of the identifier segment. The other controllers have apparatus selectively activated only during initialization for disabling the comparison means and such other controllers so that no addresses are accepted by the other controllers during the initialization. In other words, the comparison means in the master controller is completely bypassed during initialization whereby the read-only initialization program is accessed only through the master controller.

9 Claims, 3 Drawing Figures

INITIALIZATION APPARATUS FOR A DATA PROCESSING SYSTEM WITH A PLURALITY OF INPUT/OUTPUT AND STORAGE CONTROLLER CONNECTED TO A COMMON BUS

DESCRIPTION

1. Technical Field

The present invention relates to data processing systems and particularly to data processing systems having a common system bus connecting a central processing unit with a plurality of storage units and/or I/O devices.

2. Background Art

In the data processing art including present day microprocessor technology, it is a common expedient to use a common data bus connecting a central processor to a plurality of storage and/or input/output units such as disks, displays or printers. The central processor communicates with these I/O devices or storage units via the common bus by means of a plurality of controllers connected to the common bus with each controller interfacing between a central processor and at least one storage unit or I/O device. Since all of the controllers access the common bus, an address sent from the central processor contains an identifier which indicates the specific controller to which the address is directed. The controllers in turn contain comparators for comparing the identifier in the address to a stored controller identifier and where there is a coincidence of identifier, then the address is accepted by the particular controller. In accordance with conventional practice, the comparators are 'hard wired' with a particular identifier so that identifier associated with a particular controller cannot be changed. The use of programmable comparators in controllers with variable identifiers is known in the art. While such programmable comparators may provide the user with considerable flexibility, such systems present significant problems in the initialization phase of the system involved in bringing the system on line after the power has been turned on. Conventionally, initialization involved having the central processor unit access an initialization program, usually a read-only program stored in a storage unit. The CPU would then carry out the accessed program. In conventional apparatus, such an initialization program was stored in one of the storage units, and subsequent to powering on, the CPU would access the appropriate storage unit through its controller by sending an address containing the identifier segment which matched the appropriate controller identifier which had been already hard wired into the controller. However, in apparatus which utilized a programmable comparator there could be no hard wired identifier associated with any controller since the identifiers had to be loaded into their appropriate controller during the initialization of the system. Consequently, accessing of the initialization program presented a problem.

The present invention solved this problem by providing initialization apparatus for accessing a stored initialization program through a selected controller.

DISCLOSURE OF THE INVENTION

In a data processing system of the type above having a central processor, a common bus connected to the central processor and a plurality of controllers connected to the common bus with each controller respectively interfacing between the central processor and a storage unit and/or input/output device, wherein the central processor contains means for including in addresses sent on the common bus, identifier segments indicating the respective controller to which the address is being sent and the controllers have programmable comparison means for comparing the identifier segments to stored controller identifier, the present invention provides an improvement wherein the initialization means include a read-only program stored in one of the storage units. The controller interfacing with this storage unit thus becomes the master controller. Means are provided in this master controller which are activated only during the initialization. These means will accept all addresses irrespective of the identifier segment. In other words, the identifier segment in any address is bypassed or ignored. Further means are included in each of the other controllers which are selectively activated during initialization to disable the programmable comparison means in these other controllers so that these other controllers will not accept any address during the initialization. Accordingly, all addresses irrespective of their identifier segments will be channeled through the master controller during the initialization. Accordingly, during the initialization period, when there are no program controller identifiers yet available to a programmable comparison means in each of said controllers, all of the controllers except the master controller are temporarily disabled and the master controller passes all addresses so that the initialization program which is stored in the storage units associated with the master controller may be readily accessed.

A further and more specific aspect of the present invention involves processors having addressing means which comprise an address space representing the range of storage addresses of the storage locations which the processor is capable of accessing as well as pointer means for pointing to the address of the storage location currently being accessed; the address space is further subdivided into a plurality of repetitive address subspaces of equal size with all of the addresses in each subspace respectively having a common identifier segment. The range of addresses in each subspace are the same as the range of addresses in every other subspace with the exception of the identifier segment. Thus, during initialization, the master controller accesses the same location in the storage unit in response to each of several addresses which occupy the same position in each of the subspaces. With such an arrangement, during the powering on of the equipment, the processor pointer can indicate a predetermined address for accessing the stored initialization program to activate the initialization means even though this predetermined address has an identifier segment which is different than that of the actual storage address being accessed. This is the case because with the apparatus described above, during initialization, all identifier segments are ignored and the addresses are passed only through the master controller associated with the storage unit in which the initialization program is stored. However, for the effective operation of the present invention, it is preferred that before the initialization means become deactivated, the pointer in the processor should be pointing to an address having an identifier corresponding to the identifier segment in the address of the storage location being accessed. In other words, the pointer should be pointing to an address in a subspace having an identifier corresponding with the identifier of the storage unit in which the initialization program is being stored.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
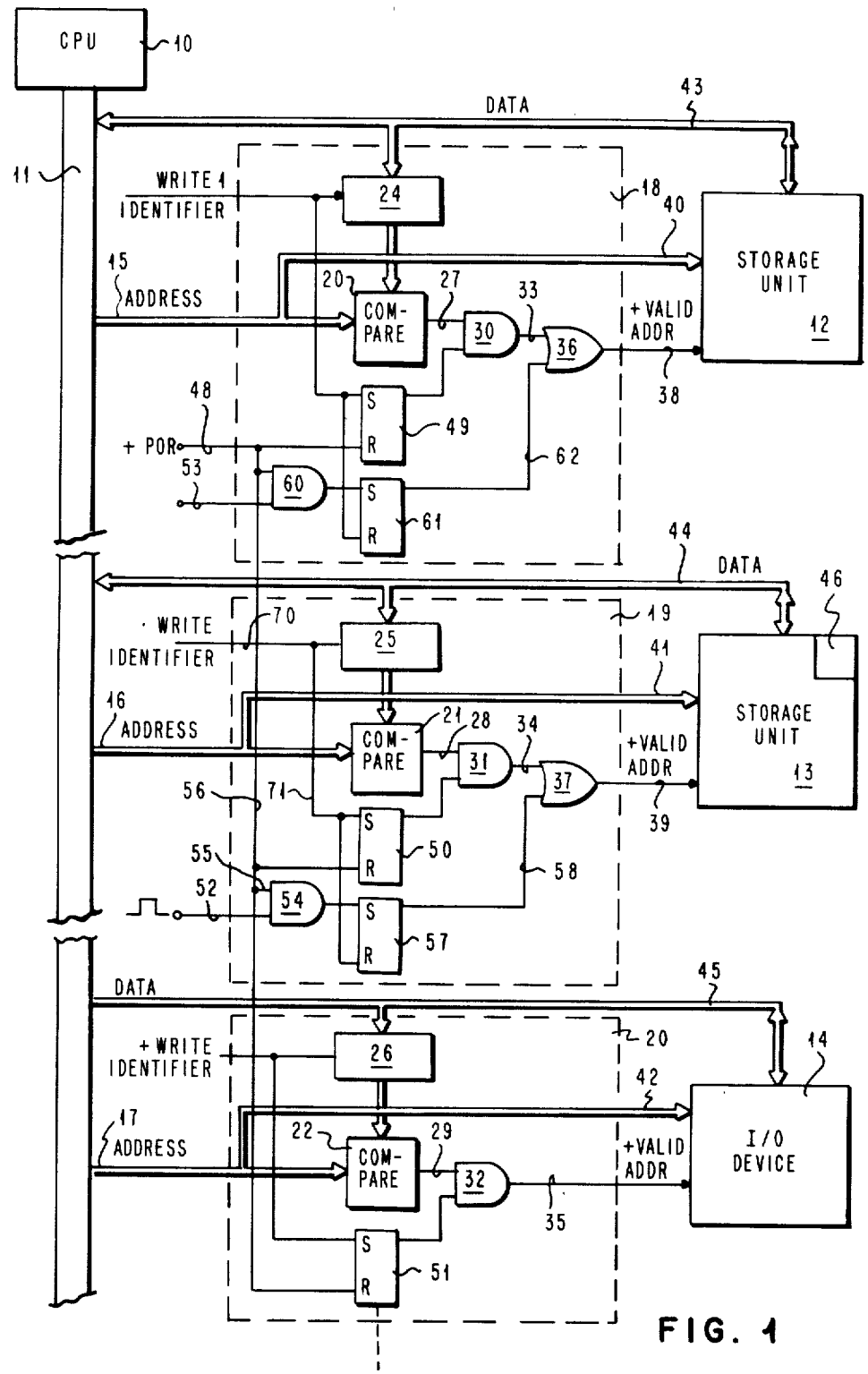
FIG. 1 is a logic diagram showing the apparatus used to carry out the present invention.

With reference to FIG. 1, a generalized diagram of the apparatus used to carry out the present invention is shown. A central processing unit 10 communicates through common bus 11 with storage units such as units 12 and 13 or I/O devices such as I/O device 14, respectively through address buses 15, 16 and 17 and respective storage control units 18, 19 and 20. During normal operation when a particular storage or I/O device is to be addressed, the address of the storage unit or device is applied to all of the address buses 15, 16 and 17. The address has an identifier segment respectively applied to the compare units 20, 21 and 22 in the controllers. The respective compare units compare this identifier segment with a controller identifier unique to each of the respective controllers 18, 19 and 20 respectively stored in controller identifier registers 24, 25 and 26. These controller identifier registers are programmable, i.e., the identifiers may be changed as desired. In the controller in which there is a valid compare, an output will be made on one of lines 27, 28 or 29 respectively to AND gates 30, 31 and 32 the other input of which has been previously applied during the initialization period as will be hereinafter described. Consequently, only in the controller wherein there is valid compare will an output be made on one of lines 33, 34 and 35. In the case of controllers 18 and 19 an input respectively on lines 33 or 34 to OR gates 36 or 37 will result in an output indicative of a valid address respectively to storage units 13 or 14 on lines 38 or 39. In the case of controller 20 the previously mentioned output on line 35 is indicative of a valid address. Where there is an indication of a valid address on either of lines 38, 39 or 35 to respective units 12, 13 or 14, then the address which has already been applied to the unit via buses 40, 41 and 42 will be accepted by either unit 12, 13 or 14 as an appropriate address to either a storage location or an I/O function in the particular unit. The data or commands which follow the address will then be directly applied from the CPU to the unit via either one of data lines 43, 44 or 45.

Figure 2:
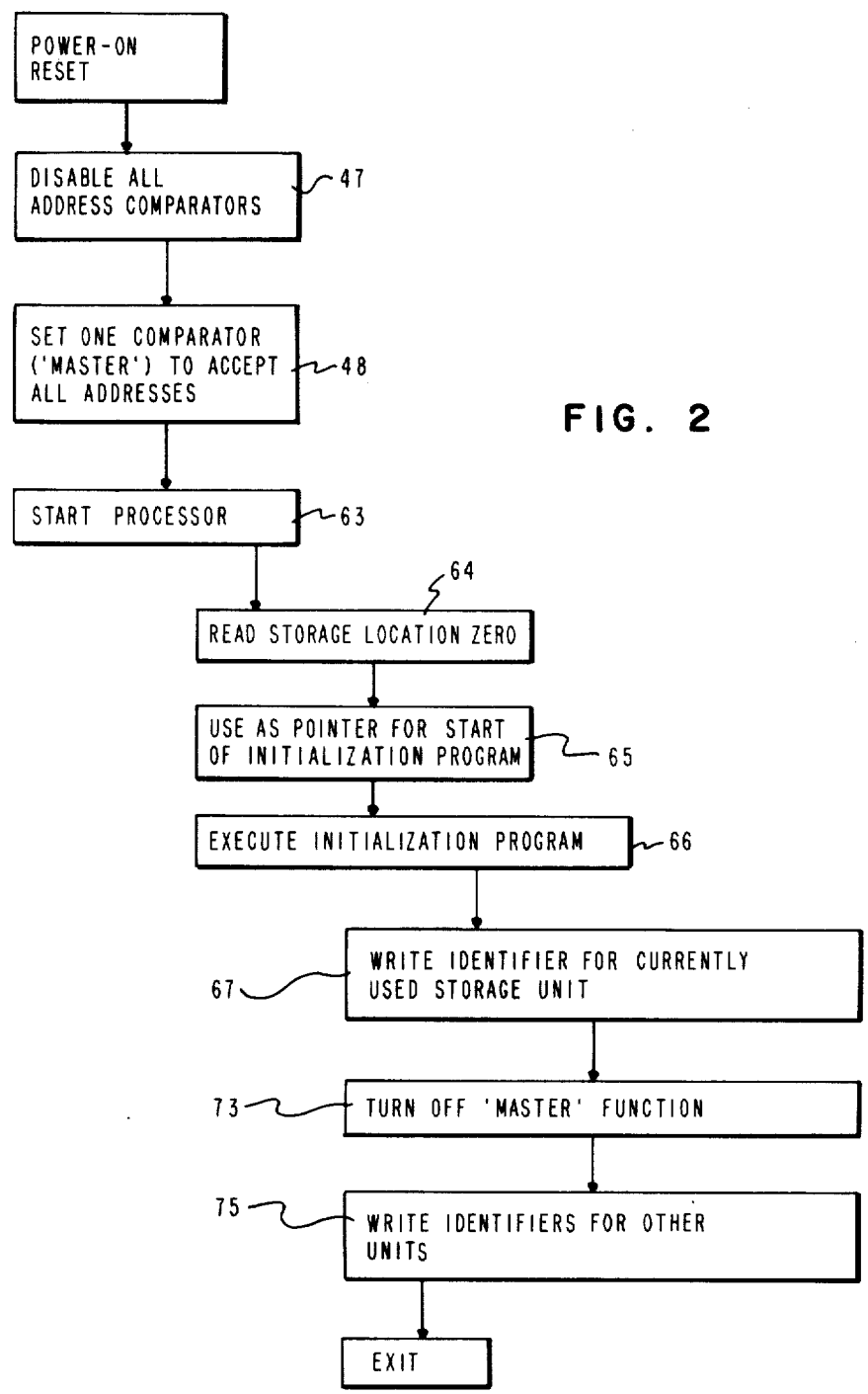
FIG. 2 is a flow chart of the general procedure involved in the practice of the invention.

With this standard operation in mind we will now consider what occurs during the initialization period after power on with respect to the procedural flow chart of FIG. 2 and initially with respect to the hardware in FIG. 1. When power is turned on, POR, then step 47, FIG. 2, a reset pulse is applied via line 48. This acts to reset flip-flop latches 49, 50 and 51 which in turn disables AND gates 30, 31 and 32 to thereby disable all address comparators 20, 21 and 22. Next, the comparator in the master controller is set to accept all addresses irrespective of the identifier segment. For purposes of this description, comparator 21 in controller 19 will be considered to be the master comparator because the initialization program is stored in storage unit 13 at a location designated 46. This is accomplished by applying selected signal level to input 52 of master controller 19 while maintaining input 53 associated with controller 18 down. As a result there is an output to AND gate 54, the other input 55 of which has already been raised through the application of the initial POR pulse on line 48 via line 56. The output from gate 54 in turn sets latch 57 which produces an output on line 58 to OR gate 37 which in turn applies a valid address indication to storage unit 13 on line 39. Thus, during the initialization period, line 39 is maintained up by OR gate 37 and comparator 21 is essentially bypassed via OR gate 37 and all addresses irrespective of the identifier segment are applied to storage unit 13 via line 41. Thus, the initialization program stored in memory location 46 may be accessed and obtained by the CPU via data bus 44. At the same time it should be noted that since input 53 to AND gate 60 in controller 18 remains down, flip-flop latch 61 will not be set and there will be no pulse on line 62. Thus, OR gate 36 will not function and line 38 will remain down whereby comparator 20 in controller 18 is in effect disabled. As long as the system remains in this initialization condition, all addresses from CPU 10 will proceed to storage unit 13 through controller 19 as previously described.

Processor will then commence to carry out the initialization program, step 63. The processor, step 64, reads location O in its address space and then uses the location step 65 as the pointer for the commencement of the initialization program which is obtained from storage unit 13 and executed, step 66. The operation of steps 64 through 66 will hereinafter be described in greater detail with respect to the configuration shown in FIG. 3. In the meantime in order to complete the description of the logic involved in the operation as shown in FIG. 1, we will continue with the description of the procedure shown in FIG. 2. At some stage in the initialization program, the identifier for controller 19 which is functioning as the master controller to control storage unit 13 is obtained by the CPU from storage unit 13 and written into master controller identifier register 25, step 67, FIG. 2. The writing of this identifier along line 70 will turn off the master mode of operation of controller 19 by applying a reset pulse to flip-flop 57 via line 71 as well as a set pulse to flip-flop latch 50 via the same line. The effect is to turn off the output on line 58 thus turning off OR gate 37 while at the same time applying an output from latch 50 to AND gate 31 so that on any future compare an output from compare unit 21 on line 28 will produce an output from AND gate 31. This turns off the master mode of operation, step 73, FIG. 2.

The program then proceeds to write identifiers for the other units respectively into registers 24 and 26 in the manner previously described which in turn enables AND gates 30 and 32 in these units so that the units may pass an address when there is a valid compare respectively on either compare unit 20 or 22, step 75, FIG. 2.

Figure 3:
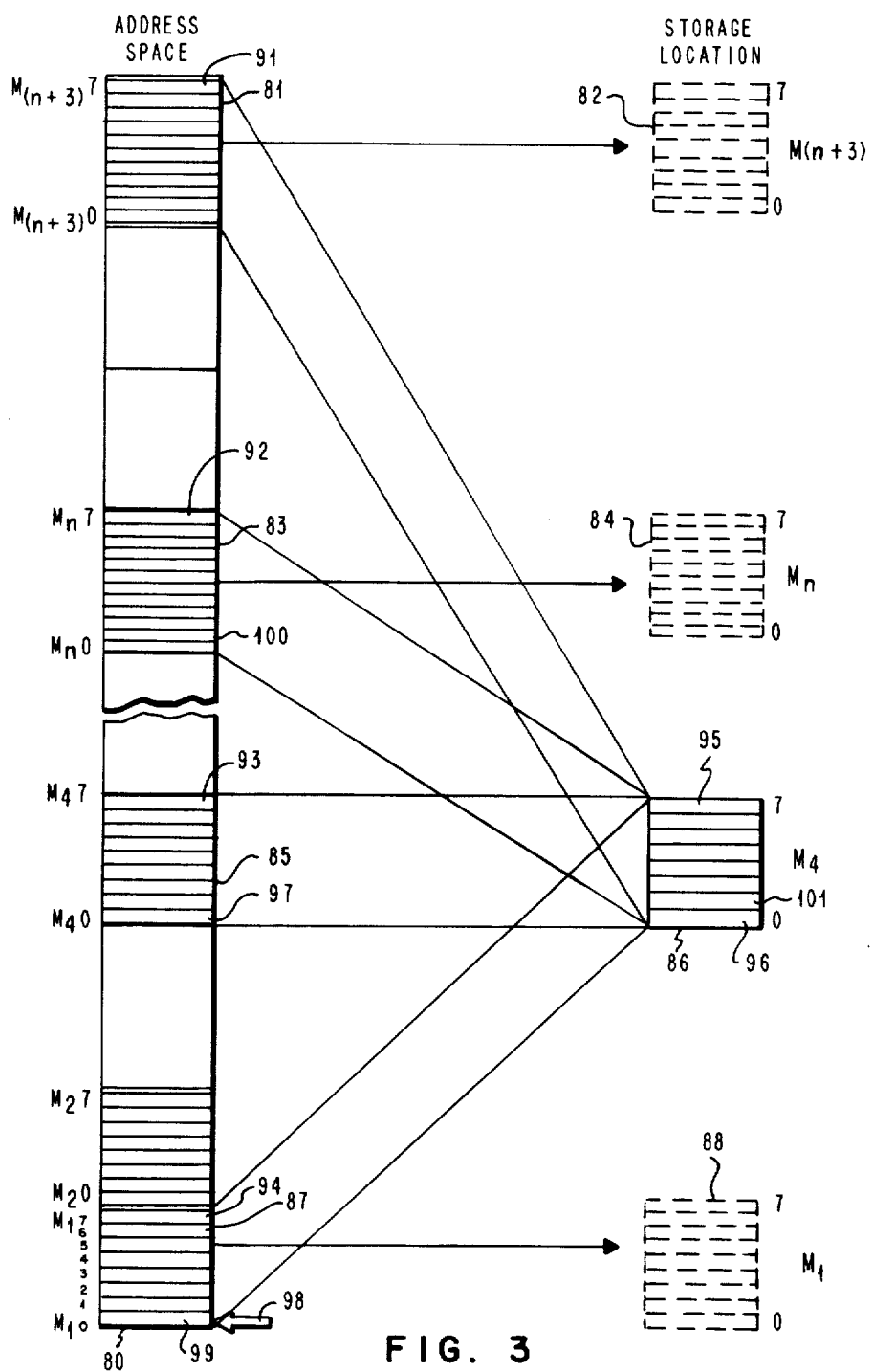
FIG. 3 is a diagram showing the relationship of the arrangement of the address space in the central processor with respect to the arrangement of actual memory locations accessed through the addresses in the address space.

Now with respect to FIG. 3, we will show the relationship of the address space in the central processor with the location in the storage unit involved in the preferred embodiment of the present invention. For convenience in description, let us assume that the initialization program is stored at location 46, storage unit 13 of FIG. 1. The address space arrangement in the CPU is shown at 80 in FIG. 3. The address space, addresses $M_1O$ through $M_{(n+3)}$, is broken down into a series of subspaces $M_1, M_2, \ldots M_4 \ldots M_n \ldots M_{(n+3)}$. Each address space had a sequence of identical addresses, i.e., 0-7. Each address is made up of two portions, an identifier, e.g., $M_1$ or $M_2$ or $M_n$ as well as the actual address which for convenience in the present description would be 0-7. It is important to note that the address patterns in each of the subaddress sections are identical, i.e., 0-7. Thus, if the identifier segment, e.g., $M_2$ or $M_n$ were removed or discarded or bypassed, then, the address pattern of 0-7 in each of the subspaces would be identical.

The addresses in each address subspace have an equivalent storage location in a storage unit, e.g., address space 81 has an equivalent storage location 82, address space 83 has an equivalent storage location 84, address space 85 has an equivalent storage location 86 and address space 87 has an equivalent storage location 88 during normal addressing operations. However, during the initialization period when as previously described the identifier segment of the address is ignored or discarded and only the remainder of the address is used, then the addresses in all of subspaces 81, 83, 85 and 87 will access a single storage location 86. In other words, during this initialization period, addresses 91, 92, 93 and 94 all in the 7th position of their respective subspaces will access storage location 95 which is at the 7th position in storage location $M_4$. This affords a substantial advantage to the CPU during the initialization when we are trying to access the initialization program stored at storage location $M_4$. Thus, if the first step in the initialization program is located at storage position 96 which is the zero position in storage location $M_4$, it is not necessary to commence addressing from its equivalent address in the address space, i.e., $M_4O$, 97. Rather, the address pointer 98 in the CPU may point to the first or zero address in the CPU address space line 99 which has the addressed $M_1O$. The advantage of such an arrangement is that CPU may commence its addressing at any zero or home position readily accessible in the operations of the CPU. The initialization program need not be stored at the storage location equivalent of this CPU zero or home position but may be stored at any convenient storage location.

In turn, the address at storage location 96 may then be returned to the CPU and result in an operation where the CPU believes that it is accessing a storage location such as the equivalent of address position 100 when actually it accesses only storage locations in $M_4$, e.g., storage location 101 because identifier segment is discarded. This arrangement shown in FIG. 3 may be continued during the initialization program until the point when the system goes out of the master mode of operation. It is important that by the time a system has completed the master mode of operation, i.e., the point when the identifier is written on line 70 (FIG. 1) into control register 25 to complete master mode of operation, then, the address in the address space pointed to by pointer 98 must correspond with the full address of the storage location. In other words, by the time this point is reached if the storage location at which the initialization program is being stored as previously described is location $M_4$, then, the pointer should be pointing to a location between $M_4O$ and $M_47$.

While the invention has been particularly shown and described with reference to a preferred embodiment it will be understood by those skilled in the art that various other changes in form and detail may be made without departing from the spirit and scope of the invention.

I claim:

1. In a data processing system comprising
    a central processor,
    a common data bus connected to said central processor,
    a plurality of controllers connected to said common bus, each controller respectively interfacing between said central processor and at least one storage unit or input/output device,
    means in said central processor for including in addresses sent on said common bus, identifier segments indicating the respective controller to which address is being sent, and
    programmable comparison means in each controller for comparing said identifier segment to a stored controller identifier representing said controller,
    the improvement comprising:
    a read-only initialization program stored in one of said storage units, said controller interfacing with said one storage unit being a master controller,
    means in said master controller selectively activated during initialization for accepting all addresses irrespective of the identifier segment, and
    means in each of said other controllers selectively activated during initialization, for disabling the programmable comparison means in each whereby no addresses are accepted by said other controllers.

2. The data processing system of claim 1 wherein
    said initialization program includes the controller identifiers representing each of said controllers, and
    said processor comprises means for applying to the comparison means in each controller the controller identifier representing said controller.

3. The data processing system of claim 1 wherein said means in said master controller for accepting all addresses includes means for by-passing said comparison means.

4. The data processing system of claim 1 wherein said read-only initialization program is stored in a read-only portion of said one storage unit.

5. The data processing system of claim 1 further including means for activating said accepting means in said master controller and said disabling means in said other controllers when said data processing system is powered on and deactivating said accepting means in said master controller and said disabling means in said other controllers upon completion of said initialization program.

6. The data processing system of claim 1 wherein said central processor comprises addressing means including
    an address space representing the range of storage addresses of storage locations which the processor is capable of accessing, and
    pointer means for pointing to the address of the storage location being accessed,
    said address space being subdivided into a plurality of repetitive address subspaces of equal size, all of the addresses in each subspace respectively having a common identifier segment, the range of addresses in each subspace being the same as the range in every other subspace except for the identifier segment whereby during initialization the master controller accesses the same location in said one storage unit in response to each of corresponding addresses in each of said subspaces.

7. The data processing system of claim 6 wherein said central processor further includes means responsive to powering-on of said processor for causing said pointer means to indicate a predetermined address in said address space for activating said accepting means in said master controller and said disabling means in said other controllers, said predetermined address having an identifier segment different than that of the address of the storage location accessed by pointing to said predetermined address during initialization.

8. The data processing system of claim 7 further including means for activating said accepting means in said master controller and said disabling means in said other controllers when said data processing system is powered on and deactivating accepting means in said master controller and said disabling means in said other controllers upon completion of said initialization program.

9. The data processing system of claim 8 wherein the storage location accessed by said predetermined address causes said pointer means to point to a subsequent address, said processor further including means to cause said pointer to point to an address having an identifier segment corresponding to the identifier segment in the address of the storage location being accessed before said accepting means in said master controller and said disabling means in said other controllers are deactivated.

* * * * *